H. W. DU PUY.
AEROPLANE WING.
APPLICATION FILED MAR. 18, 1910.

1,008,630.

Patented Nov. 14, 1911.

WITNESSES:
J. Herbert Bradley
Theodore F. Kluff

INVENTOR
H. Wilfred Du Puy
by Christy and Christy
Atty's

UNITED STATES PATENT OFFICE.

HARRY WILFRED DU PUY, OF PITTSBURGH, PENNSYLVANIA, ASSIGNOR TO PENNSYLVANIA RUBBER COMPANY, OF JEANNETTE, PENNSYLVANIA, A CORPORATION OF PENNSYLVANIA.

AEROPLANE-WING.

1,008,630.  Specification of Letters Patent.  Patented Nov. 14, 1911.

Application filed March 18, 1910. Serial No. 550,091.

*To all whom it may concern:*

Be it known that I, HARRY WILFRED DU PUY, residing at Pittsburgh, in the county of Allegheny and State of Pennsylvania, a citizen of the United States, have invented or discovered certain new and useful Improvements in Aeroplane-Wings, of which improvements the following is a specification.

My invention relates to improvements in wing construction for aeroplanes, and its object is to provide a wing structure possessing lightness, together with constancy of form in a degree not heretofore realized.

Figure 1:
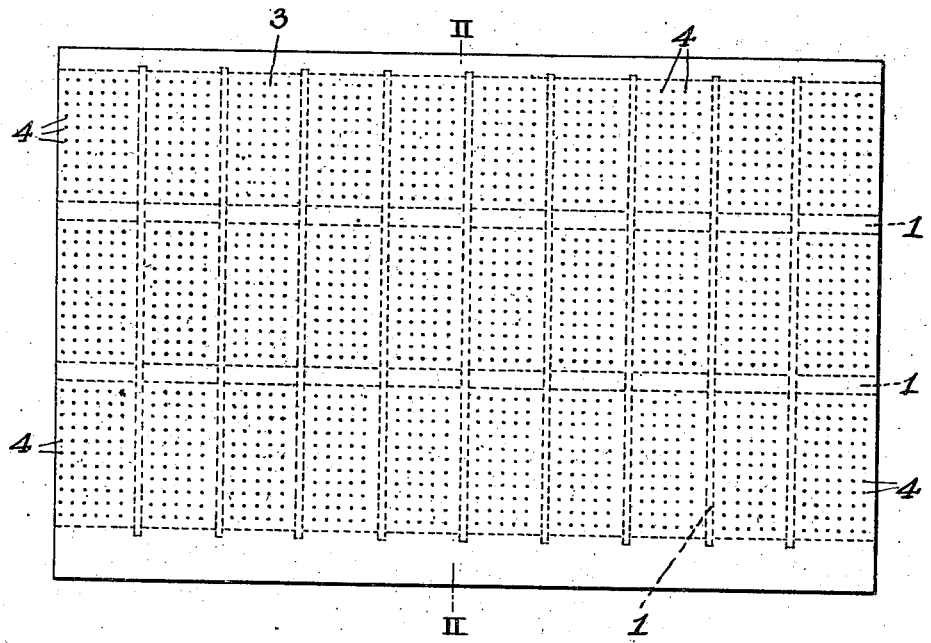
Figure 2:
Figure 3:
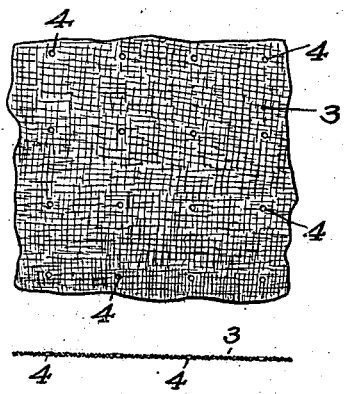

In the accompanying drawings which form part of this specification, Figure 1 is a plan view of the nether side of a wing for an aeroplane which embodies my invention; Fig. 2 is a transverse vertical section of the wing from anterior to posterior edge; and Fig. 3 illustrates on larger scale a small portion of the nether membrane of the wing, both in plan and in cross section.

Parts which are repeated in the several figures bear the same reference numerals in each case.

In order to obtain the greatest efficiency in aeroplanes, it is very desirable that the predetermined shape of the wing shall remain constant, irrespective of variation in air pressure exerted upon it. When an aeroplane is moving, the pressure of air upon the structure is increased over those surfaces which tend to support it, and such increase of pressure tends to distortion of the body of the wing itself. Heretofore it has been believed that the ideal wing structure, that is, the wing structure whose form remains constant or substantially so in all conditions of service, can only be effected by forming the surfaces of the wing of wood or metal or other unyielding material. Such substances are however entirely too heavy to be practical for such use. It has therefore been customary to build the wing of a rigid frame work, and to spread upon that frame work membranes of light weight fabric, such as percale, rubberized or varnished, such membranes of fabric forming upper and nether wing surfaces, with the frame work inclosed between them. A wing so built is, but for the body of the frame work, hollow, and includes open spaces within the integument. A wing so constructed is, unless provision is made to the contrary, subject to distortion when the aeroplane with which it is equipped is moving through the air at appreciable speed; and, as above stated, such distortion tends to decrease the efficiency of the wing. My invention is directed to a remedy of this difficulty with wings constructed as described of fabric stretched upon a frame work.

Referring to the drawings, the frame work of the wing is indicated at 1. Upon this frame work is stretched the upper integument 2, and the nether integument 3. The fabric or other membrane which forms the upper integument is made practically air tight; it is preferably formed of light-weight cotton or silk, water-proofed or varnished. The nether membane, which is separated from the upper by a space within which the frame work lies, is also formed of water-proof material, preferably a water-proof fabric, having formed in it a plurality of perforations 4. These perforations are preferably relatively minute, a sixteenth of an inch more or less in diameter; and are preferably formed in great numbers closely set over the entire nether surface of the wing, as is indicated in Fig. 1, giving to the nether membrane of the wing a sieve-like character. Such perforation of the nether surface of the wing admits of the passage of the air to the space within the wing and between the upper and nether membranes thereof. In the flight of the aeroplane, when the air pressure increases over the exposed nether surface of the wing, the perforations permit the ingress of air under pressure to the interior of the wing, and such ingress of air, increasing the pressure within the body of the wing itself, eliminates to a substantial degree the difficulty referred to above of distortion under the stress of service. These openings in the nether membrane of the wing may, if the material be fabric, be formed in the weaving, so that they will not be closed in the subsequent water-proofing process; or, the fabric may be pierced by a plurality of sharp points during the water proofing process. Other suitable ways of producing the perforations in the finished product may of course be adopted.

The effect of my invention is to give to the wing, formed of fabric in the manner described, the rigid character of a wing formed of unyielding material, in a degree not heretofore attained.

This invention, it will be understood, is applicable not merely to the wings of aeroplanes properly so called, but to sails and supporting surfaces of various kinds which are employed in airship building.

I claim herein as my invention:

1. A supporting member for an aeroplane of substantially constant form under all conditions of service, consisting of a rigid frame-work and an enveloping integument, forming a hollow chamber within which said frame-work is contained, the upper surface of said integument being imperforate and substantially the entire lower surface of said integument being perforate, substantially as described.

2. A supporting member for an aeroplane of substantially constant form under all conditions of service, including in its structure upper and nether membranes with an open space between them, the only communication of said open space with the atmosphere being through perforations in said nether membrane, substantially as described.

3. A hollow or chambered wing for an aeroplane formed of a rigid frame-work and upper and lower flexible membranes stretched thereon and inclosing said frame-work, the lower membrane being perforate, substantially as and for the purposes described.

In testimony whereof, I have hereunto set my hand.

H. WILFRED DU PUY.

Witnesses:
ALICE A. TRILL,
FRANCIS J. TOMASSON.